United States Patent [19]

Cullinan

[11] Patent Number: 5,281,018

[45] Date of Patent: Jan. 25, 1994

[54] PROTECTIVE ENCLOSURE FOR COMPUTERS IN INDUSTRIAL ENVIRONMENT

[75] Inventor: Dennis J. Cullinan, Allen Park, Mich.

[73] Assignee: Comtec, Inc., Livonia, Mich.

[21] Appl. No.: 921,927

[22] Filed: Jul. 29, 1992

[51] Int. Cl.⁵ ............................................ A47B 77/08
[52] U.S. Cl. ................................................. 312/223.2
[58] Field of Search ................. 312/223.2, 138.1, 215, 312/242, 287, 291, 326, 296, 328; 361/390; 248/917, 918, 919, 920, 921, 922, 923

[56] References Cited

U.S. PATENT DOCUMENTS

| | | | |
|---|---|---|---|
| 2,101,465 | 12/1937 | Beers | 312/296 |
| 2,122,501 | 7/1938 | Thomas | 312/242 |
| 2,408,704 | 10/1946 | Taylor | 312/138.1 |
| 4,440,457 | 4/1984 | Fogelman et al. | 312/223.3 |
| 4,626,048 | 12/1986 | Goodlander | 312/223.3 |
| 4,681,378 | 7/1987 | Hellman, III | 312/223.2 |
| 4,688,862 | 8/1987 | Fowler et al. | 312/223.3 |
| 4,704,604 | 11/1987 | Fuhs | 340/700 |
| 4,718,740 | 1/1988 | Cox | 312/208 |
| 4,827,439 | 5/1989 | Licht | 364/708 |
| 4,861,121 | 8/1989 | Gotz | 312/208 |
| 4,920,458 | 4/1990 | Jones | 248/917 |
| 4,930,917 | 6/1990 | Watahiki et al. | 400/690 |

Primary Examiner—Kenneth J. Dorner
Assistant Examiner—Janet M. Long
Attorney, Agent, or Firm—Basile and Hanlon

[57] ABSTRACT

A protective enclosure for components of a computer system including a video display monitor, a printer, a keyboard and a central processing unit is disclosed for use in an industrial environment. The protective enclosure includes a housing having at least one sidewall completely enclosing the computer system. A keyboard support and storage member is pivotally connected to the sidewall for movement about a generally horizontally disposed axis between a first keyboard support position generally angularly disposed with respect to the sidewall for allowing user access to the keyboard and a second keyboard storage position generally disposed parallel with respect to the sidewall. The keyboard support and storage member defines an enclosed keyboard storage pocket for protecting the keyboard from damage in cooperation with the sidewall when in the second storage position. A printout access aperture is provided for retrieving printed paper output from a position external with respect to the housing enclosing the computer system.

19 Claims, 2 Drawing Sheets

PROTECTIVE ENCLOSURE FOR COMPUTERS IN INDUSTRIAL ENVIRONMENT

FIELD OF THE INVENTION

The invention relates in general to a cabinet or enclosure used to house a computer workstation in a harsh industrial environment, and in particular, to a computer workstation that includes a central processing unit, a keyboard, a video display monitor and a printer.

BACKGROUND OF THE INVENTION

Industrial computer systems commonly used for process control purposes are typically made up by combining a plurality of system components made by different manufacturers to meet the performance requirements of different system applications. While it is frequently possible to adapt each individual component for use in a harsh factory environment by providing sealing means in each compartment for excluding dust, moisture, chemical fumes and the like, the provision of such sealing means on an individual component basis is expensive and typically results in components which are characterized by the difficulties encountered in servicing the components. More important, the need for providing system components which are individually sealed seriously limits the variety of systems which can be set up using commercially available components. It has been found that the provision of sealed compartments for such systems has resulted in similar difficulties with respect to permitting free use of various components in the harsh factory environments while also permitting easy servicing of system components in a system console which facilitates operation of a system by a system operator.

In an effort to resolve these problems, factory floor operator interface consoles have been proposed, such as that disclosed in U.S. Pat. No. 4,827,439. While this console provides a sealed compartment chamber for a plurality of process control or computer system components including a central processing unit of a computer, a video display unit having a screen at one end for displaying data provided by the computer, and typically a recorder unit or the like, it does not provide protection for the keyboard when not in use, or a sealed enclosure for a printer, or means to access printer output from a position external to the sealed enclosure.

U.S. Pat. No. 4,861,121 discloses a space-efficient cabinet for housing a computer workstation. This patent discloses a space-efficient cabinet for housing a computer workstation which can include a video display monitor, a central processing unit with disk drive and a keypad. This cabinet has two generally opposed sidewalls and generally opposed front and back walls, which extend between the sidewalls. At least one horizontal surface is provided extending between the front, back and opposed sidewalls to carry the video display monitor. An inner angled shelf is also present, and is affixed between the sidewalls, to carry the central processing unit and disk drive. The shelf is angled downwardly from front to back relative to the horizontal allowing access to the central processing unit and disk drive whereby disks can be readily inserted into or removed from the central processing unit and disk drive. The angle of the shelf carrying the central processing unit and disk drive ensures a minimal footprint of the cabinet on the floor thus saving floor space. A movable partition is also provided to support the keypad. However, this device does not provide for any sealed environment to protect the computer system from a harsh industrial environment, and does not provide a printer enclosure or means to have access to the printer output from externally of the cabinet.

U.S. Pat. No. 4,718,740 discloses a housing and storage mechanism for a terminal keyboard and display panel. This patent discloses a rectangular housing mounted vertically on a wall having a front face hinged along the lower edge for opening to a horizontal position. A keyboard is mounted on the upper portion of the housing face interiorly of the housing. A data display panel is pivotally suspended from the lower edge of the keyboard. A mechanism activated by the front face engages the lower edge of the display panel and elevates the panel to an angle inclined for convenient viewing when the front face is lowered to a horizontal position. This device is similar to U.S. Pat. No. 4,704,604 which provides for the secure positioning of the keyboard adjacent to the video display unit in either a lowered, use position or a raised, stored position. In the use position, the keyboard is maintained in a stable horizontal orientation immediately below and forward of the face plates of the video display unit. In the stored position, the keyboard is securely maintained in a generally vertical orientation immediately forward of the video display unit's face plate so as to provide protection therefore and enhance the portability of the computer terminal. While these devices provide for the protection of the keyboard and the video display terminal, there is no provision for enclosing and protecting the central processing unit and a printer, or for providing access to printer output external to the enclosure.

U.S. Pat. No. 4,930,917 discloses construction for a sound reducing printer box. However, this soundproof box construction is not designed to protect the printer from damage in an industrial environment, and has no provision for enclosing the other components of the computer system, or for providing access to printer output external to the enclosure.

SUMMARY OF THE INVENTION

The present invention seeks to overcome the perceived disadvantages of these prior known devices. In accordance with the present invention, it would be desirable to provide an enclosure for all the components of a computer system including a video display monitor, a printer, a keyboard and a central processing unit within a single enclosure to protect the components from damage incidental to being located within an industrial environment. In addition, it would be desirable to provide access to printer output from a position external to the computer system enclosure. Furthermore, it would be desirable to provide access to the printer for periodic maintenance, such as changing the ribbon, ink cartridge or adding paper to the printer, while preventing access to the other components of the computer system to deter theft.

The present invention is an enclosure or cabinet, preferably made from a strong material, such as steel, within which a computer central processing unit, a video display monitor, a keyboard and a printer are stored for use in an industrial environment. The cabinet is sealed and is made of a material that provides substantial protection for the equipment, both from the environment, such as dust and things of that nature, and further providing protection from being bumped into by machinery or the like, such as a forklift or hi-lo, while allowing only limited access within the locked cabinet to minimize theft.

The computer keyboard is mounted to a first door which pivots from an open position to a raised, secured position. The first door is provided with an appropriate seal such that when it is closed in the raised position, the keyboard is sealed from dust and the like. The first door is pivotally mounted to a second door which, in turn, pivots about the vertical axis to permit access to the interior of the cabinet and to the printer. When the second door is closed, the face of the printer is accessible through an aperture or opening in the second door. In normal use, access can be had to the printout of the printer through the opening. There is a seal on the inside of the second door around the opening that presses against the face of the printer to prevent dust and the like from entering the interior of the cabinet. The second door permits the user to gain access to the printer which is mounted on a pivotable turntable to permit it to be rotated to obtain access to a side of the printer to make any necessary repairs to the printer, such as changing the printer ribbon, ink cartridge or adding new paper.

The protective enclosure according to the present invention houses a computer system including a video display monitor, a printer, a keyboard and a central processing unit. A keyboard support and storage member is pivotally connected to a sidewall of the housing for movement about a generally horizontally disposed axis between a first keyboard support position generally angularly disposed with respect to the sidewall for allowing user access to the keyboard, and a second keyboard storage position generally disposed parallel with respect to the sidewall, where the keyboard support and storage member defines an enclosed keyboard storage pocket for protecting the keyboard from damage in cooperation with the sidewall when in the second storage position. A printout access window is provided in the housing for retrieving printer output from a position external with respect to the housing. Preferably, the printout access window is disposed in a portion of the sidewall forming part of the keyboard storage pocket, such that when the keyboard is in the first support position, access can be obtained to the output of the printer, and when in the second storage position, the printer output window is sealed with respect to the external industrial environment.

In the preferred embodiment, a printer access door is provided allowing user access to the printer for routine maintenance, such as changing ribbons or ink cartridges, and adding additional paper to the printer, while restricting access to the other components of the computer system. Preferably, the keyboard support and storage member is pivotally connected to the printer access door. A separate independent door providing access to the entire housing and to all components of the computer system is also provided.

BRIEF DESCRIPTION OF THE DRAWINGS

The various features, advantages and other uses of the present invention will become more apparent by referring to the following detailed description and drawings in which.

DESCRIPTION OF THE PREFERRED EMBODIMENT

Figure 1:
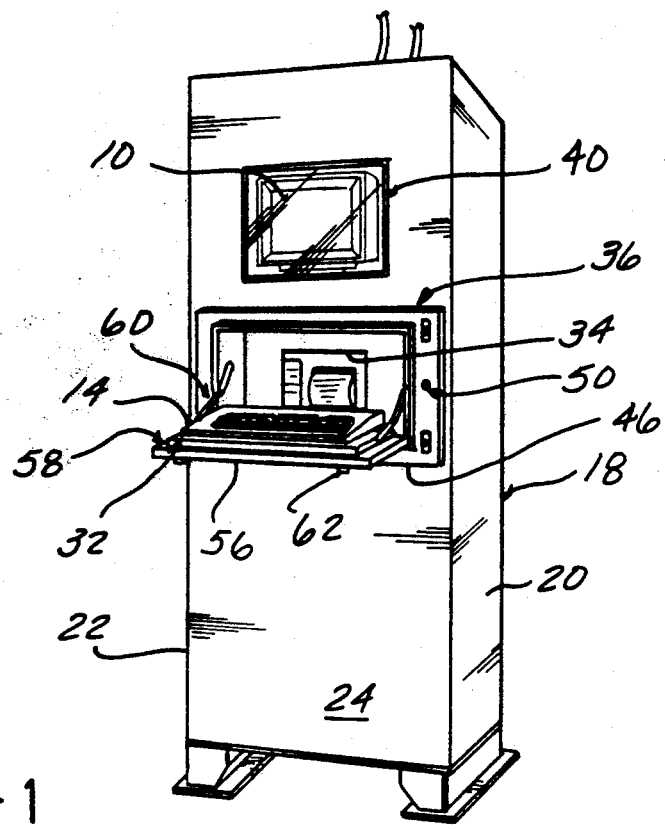
FIG. 1 is a front view of the protective enclosure according to the present invention showing keyboard support and storage means in a first keyboard support position.

A protective enclosure for a computer system including a video display monitor 10, a printer 12, a keyboard 14 and a central processing unit 16 is depicted in FIGS. 1-4. The protective enclosure according to the present invention preferably includes housing means 18 for enclosing all of the components of the computer system. The housing means 18 in the illustrated embodiment includes first, second, third and fourth sidewalls 20, 22, 24 and 26 respectively. Each sidewall is positioned at generally right angles with respect to adjacent sidewalls and is generally opposed to at least one other sidewall. A top wall 28 and bottom wall 30 are also provided generally opposed to one another and positioned at generally opposite ends of the first, second, third and fourth sidewalls, 20–26 respectively. Keyboard support and storage means 32 is pivotally connected to one of the sidewalls for movement about a generally horizontally disposed axis between a first keyboard support position, shown in FIG. 1, generally angularly disposed with respect to the sidewall for allowing user access to the keyboard 14, and a second keyboard storage position, shown in FIG. 4, generally disposed parallel with respect to the sidewall. The keyboard support and storage means 32 defines an enclosed keyboard storage pocket in cooperation with the sidewall for protecting the keyboard 14 from damage when in the second storage position. Printout access means 34 through one of the sidewalls is provided for retrieving printer output from a position external with respect to the housing means 18. Printer access means 36 is provided for allowing access to the printer for changing printer ribbons or ink cartridges, and for changing printer paper, or any other regular maintenance that may be required on the printer 12, while restricting access to any of the other components of the computer system, such as the video display monitor 10 and the central processing unit 16. To assist in performing routine maintenance on the printer 12, rotatable printer support means 38 is provided for allowing rotation of the printer about a vertical axis while maintaining the printer 12 fixedly connected to a support member, or if desired locked to the support member to prevent removal therefrom without authorization. Display window means 40 provides for viewing the video display monitor 10 from a position external to the housing means 18 while protecting the video display monitor 10 from damage due to the industrial environment. Housing access means 42 provides access to the entire interior of the housing 18 to install or conduct regular maintenance on the video display monitor 10, the printer 12, or the central processing unit 16. Shelf means 44 are provided for supporting the various computer system components at the desired locations within the housing 18, and may be vertically adjustable to accommodate different size components as is necessary.

Figure 2:
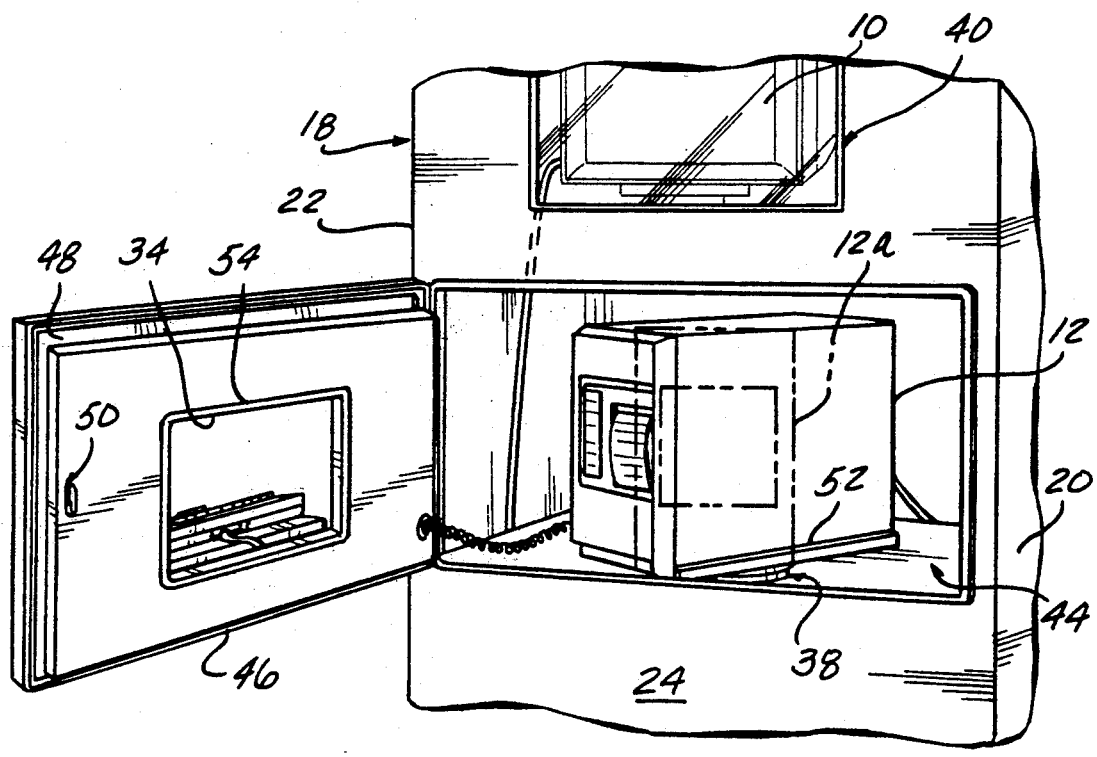
FIG. 2 is a detailed front view of the protective enclosure showing printer access means in an open position with a printer turned slighly to one side on rotatable support means to allow routine maintenance.
Figure 4:
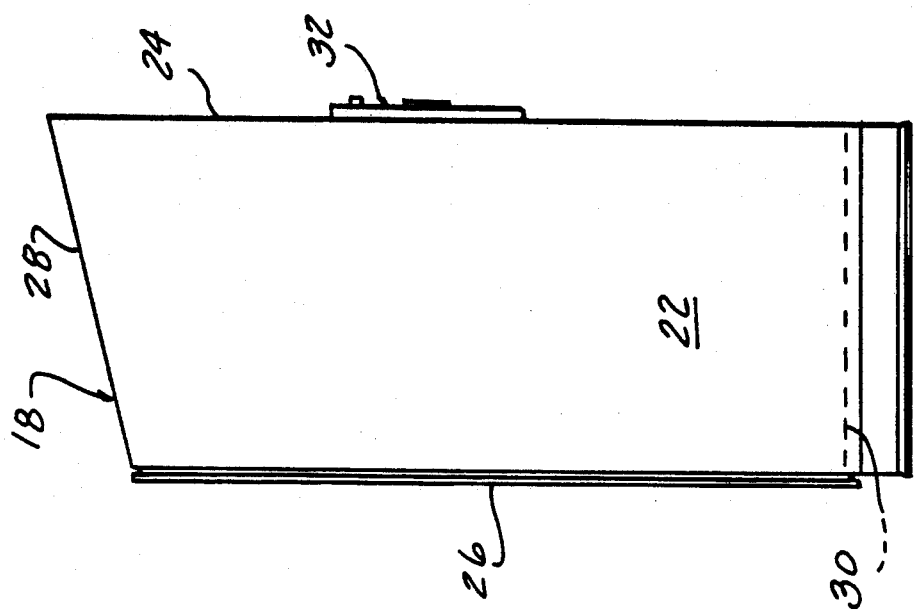
FIG. 4 is a side view of the protective enclosure according to the present invention with the keyboard support and storage means in a second storage position enclosing the keyboard in a storage pocket.
Figure 3:
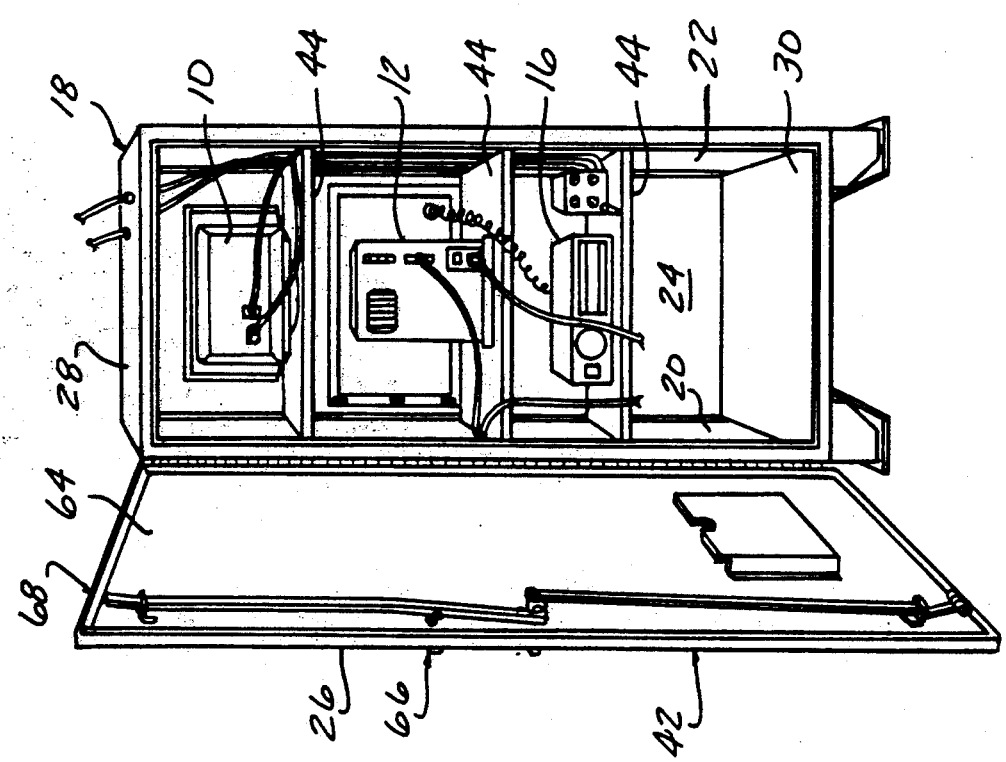
FIG. 3 is a rear view of the protective enclosure according to the present invention with an access door open allowing access to the computer system components enclosed within the housing means.

The printer access means 36 preferably includes a first door panel 46 pivotally connected to one of the sidewalls of the housing means 18. As best seen in FIG. 2 of the drawings, preferably the first door panel 46 is connected for movement about a vertical hinge axis, although it should be apparent that the hinge axis could be disposed horizontally without departing from the spirit and scope of the present invention. Seal means 48 may be provided if desired circumjacent an outer periphery of the first door panel 46. In other words, the seal means 48 is provided extending around the first door panel 46 adjacent to, or spaced inwardly from, the outer periphery of the first door panel 46. The seal means 48 provides a seal between the first door panel 46 and the sidewall of the housing means 18 when in a closed position. The first door panel 46 allows access through an opening in the sidewall of the housing means 18 when in an open position for performing regular maintenance on the printer 12 such as adding additional paper to the printer, or changing a worn out printer ribbon or ink cartridge. When in an open position, the first door panel 46 allows access to the portion of the housing means 18 supporting the printer 12 while restricting access to other portions of the housing means 18 enclosing the other components of the computer system, such as the video display monitor 10 and the central processing unit 16. Lock means 50 may be provided being operably engageable to engage between the first door panel 46 and a sidewall of the housing means 18 to limit access to the printer 12 if desired. The lock means 50 would prevent unauthorized tampering with the printer, since separate printout access means 34 is provided for receiving any printed report from the printer without requiring access to the interior of the housing means 18. Therefore, access to the printer 12 can be restricted to authorized personnel who require access to perform routine maintenance on the printer 12, such as adding paper to the printer, or replacing worn out ribbons or ink cartridges.

Rotatable printer support means 38 is preferably disposed within the housing means 18 for allowing rotational movement of the printer 12 about a vertical axis to facilitate access to the appropriate portions of the printer as required for adding new paper or replacing worn out ribbons or empty ink cartridges. The rotatable printer support means 38 preferably takes the form similar to what is commonly referred to as a "lazy susan" device. As best seen in FIG. 2 of the drawings, the rotatable printer support means 38 of the present invention preferably includes a generally U-shaped channel 52 securable to the bottom of the printer 12. The generally U-shaped channel 52 can be releasably connected to the bottom of the printer 12, such as by screws or bolts, or can be more permanently attached to the printer 12 as is desired. In addition, separate locking means (not shown) may be provided for securing the printer to the U-shaped channel 52 to prevent unauthorized removal of the printer from the housing means 18. The U-shaped channel 52 is rotatably connected to a second portion of the rotatable printer support means 38. The second portion of the rotatable printer support means 38 is fixedly secured to the housing means 18, such as by attachment to shelf means 44. Preferably, the attachment of the printer to the housing means 18 through the rotatable printer support means 38 is such that it is tamper proof from the access provided through the first door panel 46, and therefore requiring that access must be gained through the housing access means 42 in order to remove the printer from the housing means 18.

The printout access means 34 can include an aperture formed in one of the sidewalls of the housing means 18 of sufficient size to permit passage of printed paper from the printer 12 to a position external of the housing means 18, while being sufficiently small to prevent unauthorized access to the printer 12 from a position external of the housing means 18. As best seen in FIG. 2 of the drawings, preferably the printout access means 34 is provided in the first door panel 46. Seal means 54 may be provided around the periphery of the aperture defined by the printout access means 34 for engagement with a face of the printer 12 when disposed in a position generally parallel to an inner surface of the first door panel 46 in the closed position, such as that shown in phantom line in FIG. 2 designated 12a. The seal means 54 assists in reducing exposure of the components of the computer system to the industrial environment or atmosphere which typically is high in dust and other potential particulate contaminants.

The keyboard support and storage means 32 can include a second door panel 56 pivotally connected to a sidewall of the housing means 18 for movement about a horizontal axis between a first keyboard support position disposed generally angularly with respect to the sidewall of the housing means 18 and a second keyboard storage position disposed generally parallel with respect to the sidewall of the housing means 18. The second door panel 56 preferably defines an enclosed keyboard storage pocket for protecting the keyboard 14 from damage in cooperation with the sidewall of the housing means 18 when in the second stored position. The first keyboard support position can best be seen in FIG. 1 of the drawings, while the second storage position can best be seen in FIG. 4 of the drawings. Second seal means 58 is disposed circumjacent a periphery of the second door panel 56 for sealing the enclosed keyboard storage pocket with respect to the housing means 18 when the second door panel 56 is in the second storage position. Brace means 60 are provided for supporting the second door panel 56 in the first keyboard support position. As shown in FIG. 1 of the drawings, the brace means 60 can include first and second collapsible braces disposed on either side of the second door panel 56 for supporting the second door panel 56 in a position disposed generally perpendicular with respect to the sidewall of the housing means 18. Latch means 62 is operable between the second door panel 56 and the sidewall of the housing means 18 or the first door panel 46 to secure the second door panel 56 in the second storage position. Preferably, the printout access means 34 is disposed within the enclosed keyboard storage pocket such that the printout access means 34 is closed and sealed from external sources when the second door panel 56 is in the second storage position.

In the preferred embodiment of the invention, the keyboard support and storage means 32 is pivotally connected to the printer access means 36 for movement about a generally horizontally disposed axis between a first keyboard support position disposed generally angularly with respect to the printer access means 36 for allowing user access to the keyboard 14 and a second keyboard storage position disposed generally parallel with respect to the printer access means 36, where the keyboard support and storage means 32 defines a enclosed keyboard storage pocket for protecting the keyboard 14 from damage in cooperation with the printer access means 36 when in the second storage position. The printout access means is preferably disposed within the enclosed keyboard storage pocket such that the printout access means 34 is closed with respect to external sources when the keyboard support and storage means 32 is in the second position.

The printer access means 36 in the preferred embodiment includes the first door panel 46 pivotally connected to a sidewall of the housing means 18 for movement about a generally vertically disposed axis between a first closed position for preventing access to the printer 12 and a second open position allowing access to the printer 12 through an opening in the sidewall of the housing means 18. The keyboard support and storage means 32 preferably includes the second door panel 56 pivotally connected to the first door panel 46 for movement about a generally horizontally disposed axis between a first keyboard support position disposed generally perpendicular with respect to the first door panel 46 for allowing user access to the keyboard 14 and a second keyboard storage position disposed generally parallel with respect to the first door panel 46, where the second door panel 56 defines an enclosed keyboard storage pocket for protecting the keyboard 14 from damage in cooperation with the first door panel 46 when in the second storage position. The printout access means 34 is preferably formed in the first door panel 46 as an opening of sufficient size to allow printed paper from the printer 12 to exit from the housing means 18 to a position accessible from external of the housing means 18 while being sufficiently small to prevent unauthorized access to the printer 12. The printout access means 34 is preferably disposed within the enclosed keyboard storage pocket, such that the printout access means 34 is closed and sealed from external sources when the second door panel 56 is in the second position.

Housing access means 42 allows access to components of the computer system within the housing means 18. The housing access means 42 can include a third door panel 64 pivotally connected to the housing means 18 for movement about a generally vertically disposed axis between a first closed position preventing access to the components of the computer system within the housing means 18 and a second open position allowing access to the components of the computer system disposed within the housing means 18. It should be recognized, that the pivotal axis may be positioned in other orientations besides vertical without departing from the spirit and scope of the present invention. Preferably, the third door panel 64 extends generally along the full or substantially all of the width and height of the sidewall of the housing means 18 allowing full access to the entire interior of the housing means 18. Second lock means 66 may be provided to limit access to the entire interior of the housing means 18 by requiring a key for entry if desired. Third seal means 68 may also be provided around and adjacent to an outer periphery of the third door panel 64 for sealing the third door panel 64 with respect to the sidewall of the housing means 18 to prevent or reduce entry of dirt and other particulate contaminants within the housing means 18.

While the invention has been described in detail with what is considered to be the most practical and preferred embodiment of the invention, it will be apparent to those skilled in the art that the disclosed invention may be modified. Therefore, the foregoing description is to be considered exemplary, rather than limiting, and the true scope of the invention is that defined in the following claims.

What is claimed is:

1. A protective enclosure for components of a computer system including a video display monitor, a printer, a keyboard and a central processing unit, said protective enclosure comprising:

housing means having at least one sidewall, said housing means for completely enclosing said computer system;

keyboard support and storage means pivotally connected to said at least one sidewall for movement about a generally horizontally disposed axis between a first keyboard support position generally angularly disposed with respect to said sidewall for allowing user access to said keyboard and a second keyboard storage position generally disposed parallel with respect to said sidewall, wherein said keyboard support and storage means defines an enclosed keyboard storage pocket for protecting said keyboard from damage in cooperation with said sidewall when in said second storage position, said keyboard support and storage means including a door panel pivotally connected to said at least one sidewall for movement about a generally horizontally disposed axis between said first keyboard support position and said second keyboard storage position; and printout access means for retrieving printer output externally with respect to said housing means, wherein said printout access means is disposed within said enclosed keyboard storage pocket such that said printout access means is closed and sealed from external sources when said door panel is in said second position.

2. The protective enclosure of claim 1 wherein said housing means further comprises:

first, second, third and fourth sidewalls, wherein each sidewall is positioned at generally right angles with respect to adjacent sidewalls and generally opposed to at least one other sidewall, and top and bottom generally opposed walls positioned at generally opposite ends of said first, second, third and fourth sidewalls.

3. The protective enclosure of claim 1, further comprising:

window means for viewing said video display monitor from a position external of said housing means while preventing access to said video display monitor.

4. The protective enclosure of claim 1, further comprising:

housing access means for allowing access to components of said computer system within said housing means.

5. The protective enclosure of claim 1, further comprising:

rotatable printer support means for moving said printer within said housing means about a vertical axis while maintaining said printer in a securable, supported position.

6. The protective enclosure of claim 1, further comprising:

shelf means for supporting components of said computer system within said housing means.

7. The protective enclosure of claim 1, further comprising:

printer access means allowing access to said printer for changing printer paper and printer ribbons while restricting access to other components of the computer system.

8. A protective enclosure for components of a computer system including a video display monitor, a printer, a keyboard and a central processing unit, said protective enclosure comprising:

housing means having at least one sidewall, said housing means for completely enclosing said computer system;

keyboard support and storage means pivotally connected to said at least one sidewall for movement about a generally horizontally disposed axis between a first keyboard support position generally angularly disposed with respect to said sidewall for allowing user access to said keyboard and a second keyboard storage position generally disposed parallel with respect to said sidewall, wherein said keyboard support and storage means defines an enclosed keyboard storage pocket for protecting said keyboard from damage in cooperation with said sidewall when in said second storage position; and printout access means for retrieving printer output externally with respect to said housing means, said printout access means including said at least one sidewall having an opening of sufficient size to allow printer paper from said printer to exit from said housing means to a position accessible from external of said housing means while being sufficiently small to prevent unauthorized access to said printer.

9. The protective enclosure of claim 8, further comprising:

printer seal means for sealing said opening in said at least one sidewall with respect to said printer, said printer seal means extending around said opening adjacent a periphery of said opening for engagement with a face of said printer.

10. A protective enclosure for components of a computer system including a video display monitor, a printer, a keyboard and a central processing unit, said protective enclosure comprising:

housing means having at least one sidewall, said housing means for completely enclosing said computer system;

keyboard support and storage means pivotally connected to said at least one sidewall for movement about a generally horizontally disposed axis between a first keyboard support position generally angularly disposed with respect to said sidewall for allowing user access to said keyboard and a second keyboard storage position generally disposed parallel with respect to said sidewall, wherein said keyboard support and storage means defines an enclosed keyboard storage pocket for protecting said keyboard from damage in cooperation with said sidewall when in said second storage position; and printout access means for retrieving printer output externally with respect to said housing means, said printout access means allowing access to said printer for changing printer paper and printer ribbons while restricting access to other components of the computer system, said printout access means including a first door panel pivotally connected to said at least one sidewall for movement about a generally vertically disposed axis between a first closed position preventing access to said printer and a second open position allowing access to said printer through an opening in said at least one sidewall.

11. The protective enclosure of claim 10, further comprising:

lock means for securing said first door panel in said first position.

12. The protective enclosure of claim 10, further comprising:

first seal means for sealing said first door panel with respect to said at least one sidewall when in said first position.

13. The protective enclosure of claim 10, further comprising:

said printout access means disposed in said first door panel.

14. The protective enclosure of claim 10, wherein said keyboard support and storage means further comprises:

a second door panel pivotally connected to said at least one sidewall for movement about a generally horizontally disposed axis between a first keyboard support position disposed generally perpendicular with respect to said sidewall for allowing user access to said keyboard and a second keyboard storage position disposed generally parallel with respect to said sidewall, wherein said keyboard support and storage means defines an enclosed keyboard storage pocket for protecting said keyboard from damage in cooperation with said sidewall when in said second storage position.

15. The protective enclosure of claim 14, further comprising:

second seal means disposed circumjacent a periphery of said second door panel for sealing said enclosed keyboard storage pocket with respect to said at least one sidewall when said second door panel is in said second position.

16. The protective enclosure of claim 14, further comprising:

said printout access means disposed within said enclosed keyboard storage pocket such that said printout access means is closed and sealed from external sources when said second door panel is in said second position.

17. The protective enclosure of claim 14, further comprising:

brace means for supporting said second door panel in said first position.

18. The protective enclosure of claim 14, further comprising:

latch means for securing said second door panel in said second position.

19. A protective enclosure for components of a computer system including a video display monitor, a printer, a keyboard and a central processing unit, said protective enclosure comprising:

housing means having at least one sidewall, said housing means for completely enclosing said computer system;

printout access means for retrieving printer output externally with respect to said housing means, said printout access means allowing access to said printer for changing printer paper and printer ribbons while restricting access to other components of the computer system;

keyboard support and storage means pivotally connected to said printout access means for movement about a generally horizontally disposed axis between a first keyboard support position disposed generally perpendicular with respect to said printout access means for allowing user access to said keyboard and a second keyboard storage position disposed generally parallel with respect to said printout access means, wherein said keyboard support and storage means defines an enclosed keyboard storage pocket for protecting said keyboard from damage in cooperation with said printout access means when in said second storage position; and said printout access means disposed within said enclosed keyboard storage pocket such that said printout access means is closed with respect to external sources when said keyboard support and storage means is in said second position.

* * * * *